United States Patent
Clum et al.

(10) Patent No.: US 10,835,848 B2
(45) Date of Patent: Nov. 17, 2020

(54) APPARATUS AND METHOD FOR AIR PARTICLE CAPTURE IN A GAS TURBINE ENGINE

(71) Applicant: United Technologies Corporation, Farmington, CT (US)

(72) Inventors: Carey Clum, East Hartford, CT (US); Christopher W. Robak, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 555 days.

(21) Appl. No.: 14/860,604

(22) Filed: Sep. 21, 2015

(65) Prior Publication Data
US 2017/0080371 A1    Mar. 23, 2017

(51) Int. Cl.
| | |
|---|---|
| B01D 45/00 | (2006.01) |
| B01D 45/08 | (2006.01) |
| F02C 7/00 | (2006.01) |
| B01D 45/04 | (2006.01) |
| F02C 3/04 | (2006.01) |

(52) U.S. Cl.
CPC ............ *B01D 45/08* (2013.01); *B01D 45/04* (2013.01); *F02C 3/04* (2013.01); *F02C 7/00* (2013.01); *F05D 2220/32* (2013.01); *F05D 2260/607* (2013.01); *Y02T 50/60* (2013.01)

(58) Field of Classification Search
CPC . B01D 45/08; B01D 45/04; F02C 3/04; F02C 7/00; Y02T 50/675; F05D 2220/32; F05D 2260/607
See application file for complete search history.

(56) References Cited

U.S. PATENT DOCUMENTS

| | | | | |
|---|---|---|---|---|
| 2,818,935 A | * | 1/1958 | Kemmetmuller | B04C 3/00 165/119 |
| 3,483,676 A | * | 12/1969 | Sargisson | B64D 33/02 55/306 |
| 3,915,679 A | * | 10/1975 | Roach | B04C 3/04 55/347 |
| 4,242,115 A | * | 12/1980 | Harold | B01D 45/16 55/347 |
| 4,289,611 A | * | 9/1981 | Brockmann | B04C 3/04 209/710 |

(Continued)

FOREIGN PATENT DOCUMENTS

WO    2005117060 A1    12/2005

OTHER PUBLICATIONS

European Search Report for Application No. EP 16 18 9874.
(Continued)

*Primary Examiner* — Dung H Bui
(74) *Attorney, Agent, or Firm* — Cantor Colburn LLP

(57) ABSTRACT

A particle collection device for an engine is provided. The particle collection device having: an inlet for directing air towards a first member having a first orifice located therein; and a second member having a second orifice located therein, the second orifice being aligned with the first orifice and wherein the second member and the second orifice are spaced from the first member and the first orifice by a first distance, and wherein the particle collection device is located in the engine.

14 Claims, 7 Drawing Sheets
(4 of 7 Drawing Sheet(s) Filed in Color)

(56) References Cited

U.S. PATENT DOCUMENTS

| | | | | |
|---|---|---|---|---|
| 4,514,193 | A * | 4/1985 | Booth | B01D 45/16 55/290 |
| 4,746,340 | A * | 5/1988 | Durre | B01D 45/12 55/347 |
| 4,985,058 | A * | 1/1991 | Prinsloo | B04C 3/00 55/396 |
| 5,149,341 | A * | 9/1992 | Taylor | B01D 19/0057 118/603 |
| 7,770,375 | B2 | 8/2010 | Alvanos et al. | |
| 7,879,123 | B2 * | 2/2011 | Lundquist | B04C 3/00 55/306 |
| 8,092,145 | B2 | 1/2012 | Martel et al. | |
| 8,561,411 | B2 | 10/2013 | Dibenedetto | |
| 2004/0221720 | A1 | 11/2004 | Anderson et al. | |

OTHER PUBLICATIONS

Jaehark GOO: "Numerical simulation of aerosol concentration at atmospheric pressure by a cascade of aerodynamic slit lenses", Journal of Aerosol Science, vol. 33, No. 11.

N. Rao, J. Navascues and F. De La Mora, "Aerodynamic focusing of Particles in Viscous Jets" Journal of Aerasol Science, vol. 24, No. 7, pp. 879-892, 1993.

EP Office Action dated Nov. 10, 2017 for Application Serial No. 16 189 874.7.

* cited by examiner

APPARATUS AND METHOD FOR AIR PARTICLE CAPTURE IN A GAS TURBINE ENGINE

BACKGROUND

This disclosure relates to gas turbine engines, and more particularly to an apparatus and method for removing air particles and/or objects from a gas turbine engine.

Sand and/or other particles and/or objects entering or travelling thorough a gas turbine can reduce the life of parts in service by erosion and as well as thermos chemical-mechanical degradation (CMAS attack).

Accordingly, it is desirable to remove the particles and/or objects from the air/gas path of a gas turbine engine.

BRIEF DESCRIPTION

In one embodiment, a particle collection device for an engine is provided. The particle collection device having: an inlet for directing air towards a first member having a first orifice located therein; and a second member having a second orifice located therein, the second orifice being aligned with the first orifice and wherein the second member and the second orifice are spaced from the first member and the first orifice by a first distance, and wherein the particle collection device is located in the engine.

In addition to one or more of the features described above, or as an alternative to any of the foregoing embodiments, the engine may be a gas turbine engine and the second orifice is fluidly coupled to a collection chamber.

In addition to one or more of the features described above, or as an alternative to any of the foregoing embodiments, further embodiments may the first orifice may be fluidly coupled to a cooling system of the engine.

In addition to one or more of the features described above, or as an alternative to any of the foregoing embodiments, the second orifice may be fluidly coupled to a collection chamber and the particle collecting device is configured for capturing particles having a dimension of less than 50 microns in the collection chamber.

In addition to one or more of the features described above, or as an alternative to any of the foregoing embodiments, the second orifice may be fluidly coupled to a collection chamber and the particle collecting device is configured for capturing particles having a dimension of less than 10 microns in the collection chamber.

In addition to one or more of the features described above, or as an alternative to any of the foregoing embodiments, the second orifice may be fluidly coupled to a collection chamber and the particle collecting device is configured for capturing particles having a dimension of less than 5 microns in the collection chamber.

In addition to one or more of the features described above, or as an alternative to any of the foregoing embodiments, the first distance may be in the range of 0.0625 to 0.50 inches.

In addition to one or more of the features described above, or as an alternative to any of the foregoing embodiments, the diameter of the first orifice is in the range of 0.0625 to 0.50 inches and the diameter of the second orifice is smaller than the first orifice.

In addition to one or more of the features described above, or as an alternative to any of the foregoing embodiments, the inlet, the first orifice and the second orifice are configured for lensing particles into a collection chamber fluidly coupled to the second orifice.

In addition to one or more of the features described above, or as an alternative to any of the foregoing embodiments, the inlet, the first orifice and the second orifice are configured for lensing particles into a collection chamber fluidly coupled to the second orifice and wherein an area of the second orifice is smaller than an area of the first orifice.

In addition to one or more of the features described above, or as an alternative to any of the foregoing embodiments, the collection chamber may be removably secured to the second orifice.

In yet another embodiment, an engine is provided. The engine having a particle collection device, the particle collection device including: an inlet for directing air towards a first member having a first orifice located therein; and a second member having a second orifice located therein, the second orifice being aligned with the first orifice and wherein the second member and the second orifice are spaced from the first member and the first orifice by a first distance, and wherein the particle collection device is located in the engine.

In addition to one or more of the features described above, or as an alternative to any of the foregoing embodiments, the engine may be a gas turbine engine and the gas turbine engine further comprises a fan for directing the air into the engine.

In addition to one or more of the features described above, or as an alternative to any of the foregoing embodiments, the engine may be a gas turbine engine and the second orifice is fluidly coupled to a collection chamber and wherein the first orifice is fluidly coupled to a cooling system of the engine.

In addition to one or more of the features described above, or as an alternative to any of the foregoing embodiments, the second orifice may be fluidly coupled to a collection chamber and the particle collecting device is configured for capturing particles having a dimension of less than 5 microns in the collection chamber.

In addition to one or more of the features described above, or as an alternative to any of the foregoing embodiments, the second orifice may be fluidly coupled to a collection chamber and the particle collecting device is configured for capturing particles having a dimension of less than 10 microns in the collection chamber.

In addition to one or more of the features described above, or as an alternative to any of the foregoing embodiments, the second orifice may be fluidly coupled to a collection chamber and the particle collecting device is configured for capturing particles having a dimension of less than 50 microns in the collection chamber.

In addition to one or more of the features described above, or as an alternative to any of the foregoing embodiments, the engine may further include a plurality of a particle collection devices, each of the plurality of particle collection devices comprising: an inlet for directing air towards a first member having a first orifice located therein; and a second member having a second orifice located therein, the second orifice being aligned with the first orifice and wherein the second member and the second orifice are spaced from the first member and the first orifice by a first distance, and wherein the particle collection device is located in the engine.

In addition to one or more of the features described above, or as an alternative to any of the foregoing embodiments, the second orifice may be fluidly coupled to a collection chamber and wherein the inlet, the first orifice and the second orifice are configured for lensing particles into the collection chamber and wherein an area of the second orifice is smaller than an area of the first orifice.

In yet another embodiment, a method for removing at least one of particles and objects from an air flow path of an engine is provided. The method including the steps of: directing air from an inlet towards a first orifice of a first member; directing air from the first orifice towards a second orifice of a second member; and focusing particles in the air into a collection chamber fluidly coupled to the second orifice, the second orifice being aligned with the first orifice and wherein the second member and the second orifice are spaced from the first member and the first orifice by a first distance, and wherein the particle collection device is located in the engine.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to an apparatus and method for removing particles from a gas turbine engine and a gas turbine engine employing the apparatus and method for removing said particles. In accordance with one embodiment of the disclosure, some of the air traveling through various locations of the engine travels through an orifice or opening and aerodynamic lensing is used to collect particles located in the air.

Figure 1:
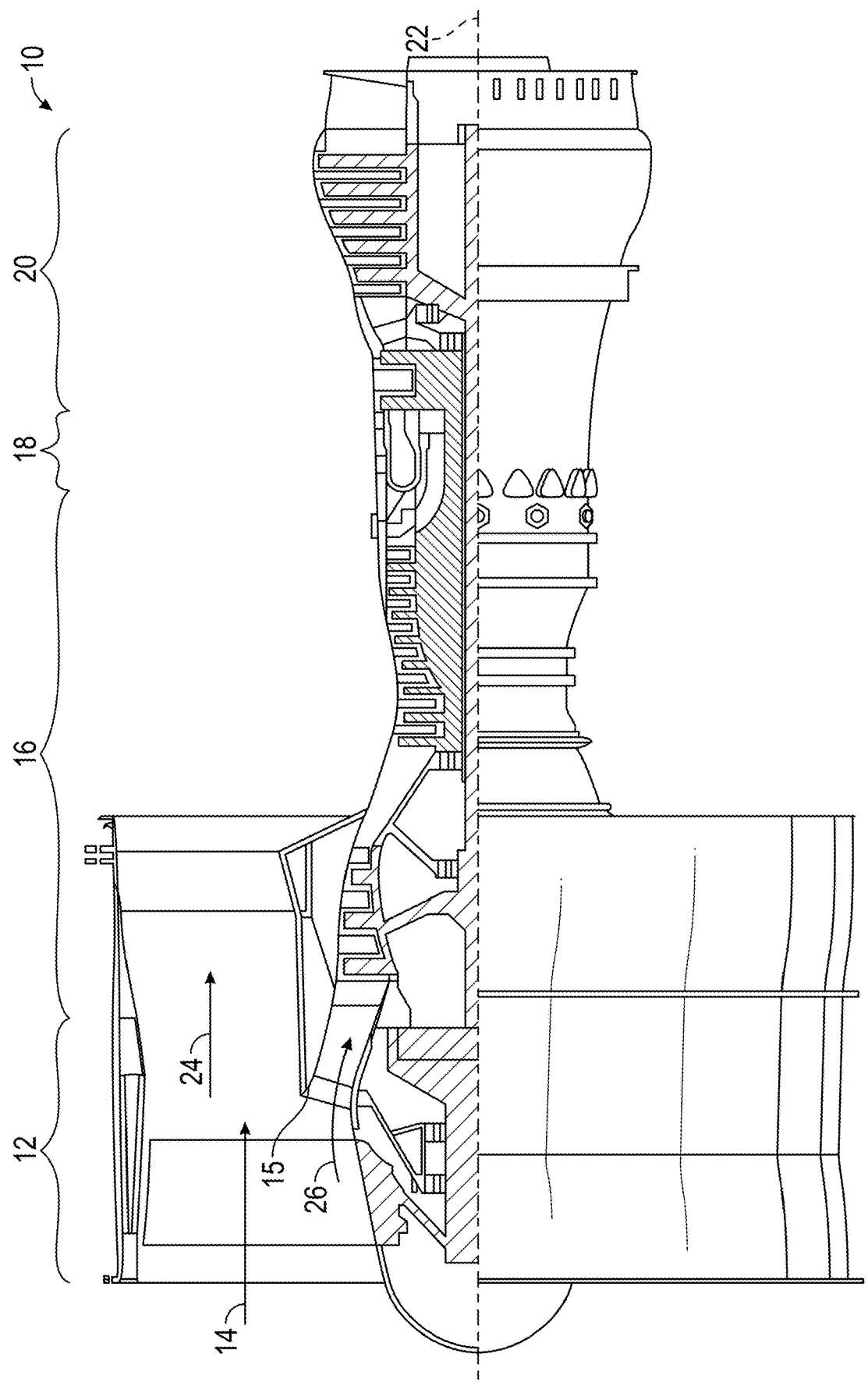
FIG. 1 is a partial cross-sectional schematic illustration of a gas turbine engine.

FIG. 1 is a partial cross-sectional schematic illustration of a gas turbine engine or engine 10. Although, a specific gas turbine engine is illustrated in FIG. 1 various embodiments of the present disclosure are contemplated for use in any engine wherein an apparatus and method for removing at least one of particles, objects, foreign objects and combinations thereof would be desired. Non-limiting examples of such engines include but not limited to the following: turbofan engines, turbojet engines, turboshaft, afterburning turbojet engines, ramjet engines as well as any other equivalent engine wherein the apparatus and methods for removing particles from a fluid stream may be employed according to various embodiments of the present disclosure. Still further, various embodiments of the present disclosure are contemplated for use in any engine that may be suitable for use in an aircraft wherein an apparatus and method for removing particles would be desired. The gas turbine engine 10 of FIG. 1 generally has a fan 12 through which ambient air is propelled in the direction of arrow 14 towards an inlet or inlet opening 15 that directs the air towards a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis 22 of the gas turbine engine 10.

The gas turbine engine 10 may further comprise a low pressure compressor located in front of a high pressure compressor and a high pressure turbine located in front of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine. As illustrated, the air from fan 12 may be divided into a primary air flow path 24 and a secondary air flow path 26.

Figure 2:
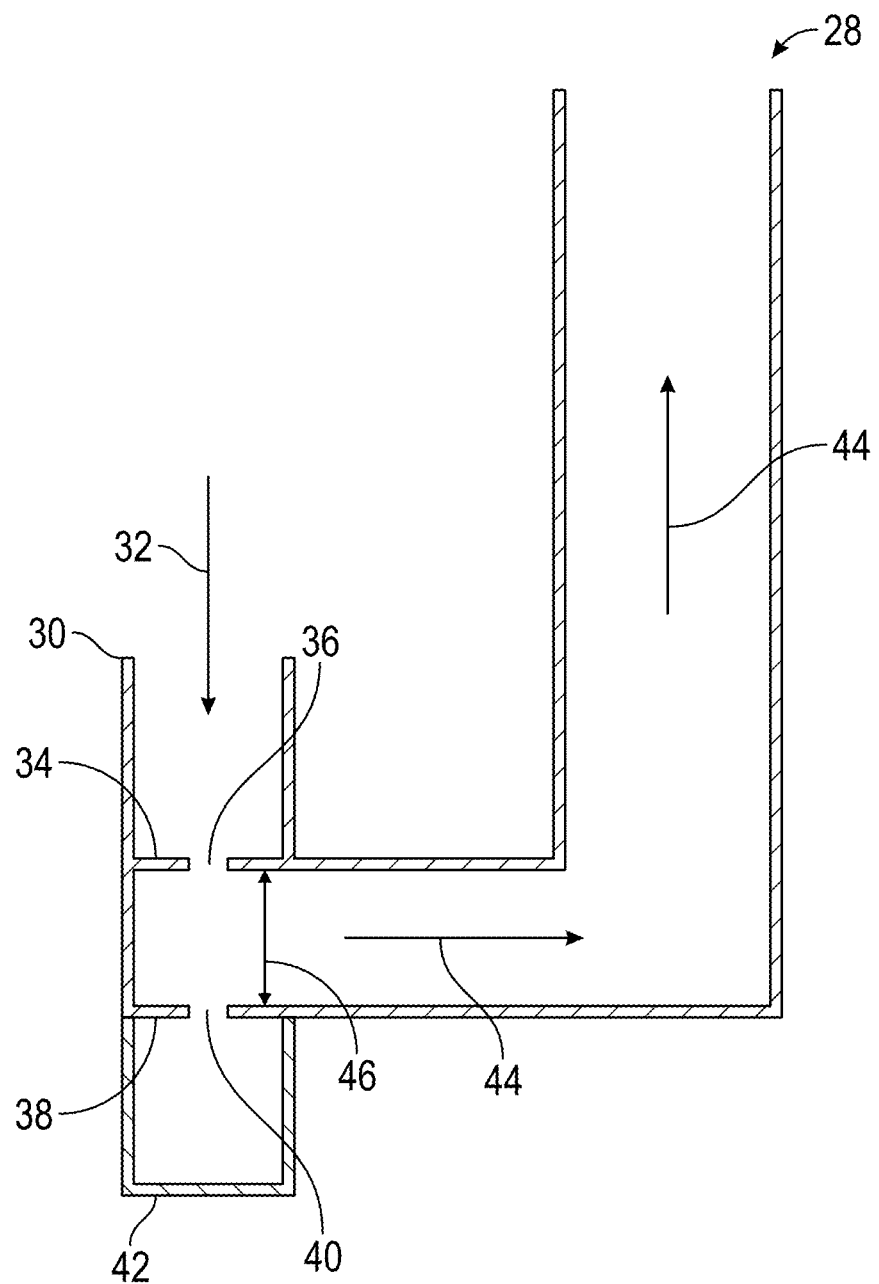
FIG. 2 is a schematic illustration of a particle collection device in accordance with an embodiment of the disclosure.

Referring now to FIG. 2, a particle or object collection device or apparatus or aero lens device 28 of the engine 10 is illustrated schematically. In general, the particle collection device or apparatus or aero lens device 28 is configured to have an inlet or inlet conduit 30 for directing an air flow in the direction of arrow 32 towards a first surface, plate or member 34 that has a first orifice or first opening 36. Located behind first surface, plate or member 34 is a second surface, plate or member 38 that has a second orifice or second opening 40 that is configured to create an aerodynamic lensing effect such that particles and/or objects traveling in the direction of arrow 34 are captured in a collection chamber 42 located behind second plate or member 38 and second opening 40 while the air without the captured particles flows in the direction of arrows 44.

For example and in accordance with various embodiments of the disclosure, air travelling in the engine first goes through a first orifice and particles are collected into a dead or almost dead chamber by using an aerodynamic lensing effect. Aerodynamic lensing concentrates particles that are low in concentration to allow for easier detection and thus capture. As the particles approach the first orifice they are drawn in and follow their momentum forming a focal point 45 (see at least FIGS. 4-6), a length of which is determined by particle size and as the air turns to go around the dead or almost dead chamber the particles are forced to follow their own trajectory into a collection zone of a second orifice that is fluidly coupled to a collection chamber 42.

In one embodiment, the air flowing in the direction of arrows 44 may be used for blade/vane cooling of the engine 10 or any cooling system of the engine 10. In one embodiment, collection chamber 42 may be removably secured to the device or apparatus 28 such that collected particles may be removed and/or cleaned out so that chamber 42 does not become saturated with particles. In one embodiment, the chamber 42 may be removed and cleaned for subsequent reuse or chamber 42 may be disposable such that upon removal, a new empty chamber 42 is used to replace the removed chamber.

In order to determine the proper configuration of the device, apparatus or aero lens device 28 for capturing a particular particle size. The lens device 28 can be configured to capture certain particle sizes as a function of a first distance 46 between the plates or members 34 and 38 and a ratio of the width or diameter or area of the first orifice 36 to the width or diameter or area of the second orifice 40. In one non-limiting embodiment, the diameter of the first orifice is in a range of 0.0625 to 0.50 inches. Of course, ranges greater or less than the aforementioned ranges are contemplated to be within the scope of various embodiments of the disclosure. In addition and in combination with any of the aforementioned embodiments or as a stand-alone feature the first distance 46 may be within a range of 0.0625 to 0.50 inches. Of course, ranges greater or less than the aforementioned ranges are contemplated to be within the scope of various embodiments of the disclosure. In addition and in one non-limiting embodiment, the diameter, width or area of the second orifice 40 may be smaller than the diameter, width or area of the first orifice 36.

For example and in one embodiment, the apparatus or aero lens device is configured for capturing particles having a dimension of less than 5 microns. In this embodiment, the first distance 46 and the diameter or area of the first orifice and the diameter or area of the second orifice are configured such that the focal point 45 is approximately at the second orifice. In yet another embodiment and for an apparatus or aero lens device 28 configured for capturing particles having a dimension of less than 10 microns, the first distance 46 and the diameter or area of the first orifice and the diameter or area of the second orifice are configured such that the focal point 45 is approximately at the second orifice. These distances and dimensions may different than those for an apparatus or aero lens device that is configured to capture particles having a dimension of less than 5 microns. Still further and in yet another embodiment and for an apparatus or aero lens device 28 that is configured to capturing particles having a dimension of less than 50 microns, the first distance 46 and the diameter or area of the first orifice and the diameter or area of the second orifice are configured such that the focal point 45 is approximately at the second orifice. These distances and dimensions may different than those for an apparatus or aero lens device that is configured to capture particles having a dimension of less than 5 microns or for an apparatus or aero lens device that is configured to capture particles having a dimension of less than 10 microns. In order to capture particle of specific size or dimension, the apparatus or aero lens device 28 will need to be configured based upon in part the velocity of the incoming flow. Still further and in various non-limiting embodiments of the disclosure, the apparatus or aero lens device 28 may be configured to capture particles having a dimension greater than 50 microns, wherein the first distance 46 and the diameter or area of the first orifice and the diameter or area of the second orifice are configured such that the focal point 45 is approximately at the second orifice in order to capture particles or objects having a dimension greater than 50 microns.

Of course, various embodiments of the disclosure contemplate dimensions and/or ranges greater or less than the aforementioned ranges and/or smaller nested ranges that may be within the aforementioned range or have a portion of the smaller range within the aforementioned ranges.

In accordance with one embodiment of the disclosure, the orifice spacing is a function of the Reynolds number (Re), which is a dimensionless quantity that is used to help predict similar flow patterns in different fluid flow situations. The Reynolds number through an orifice is going to be a function of: diameter of the orifice; velocity of the air flow, which is set by the pressure ratio across the hole or orifice; and viscosity, which is dependent upon the material property and is a function of temperature.

As mentioned above, the spacing between the plates and orifice or opening diameters will be dependent on the size of the particles to be captured.

Figure 3:
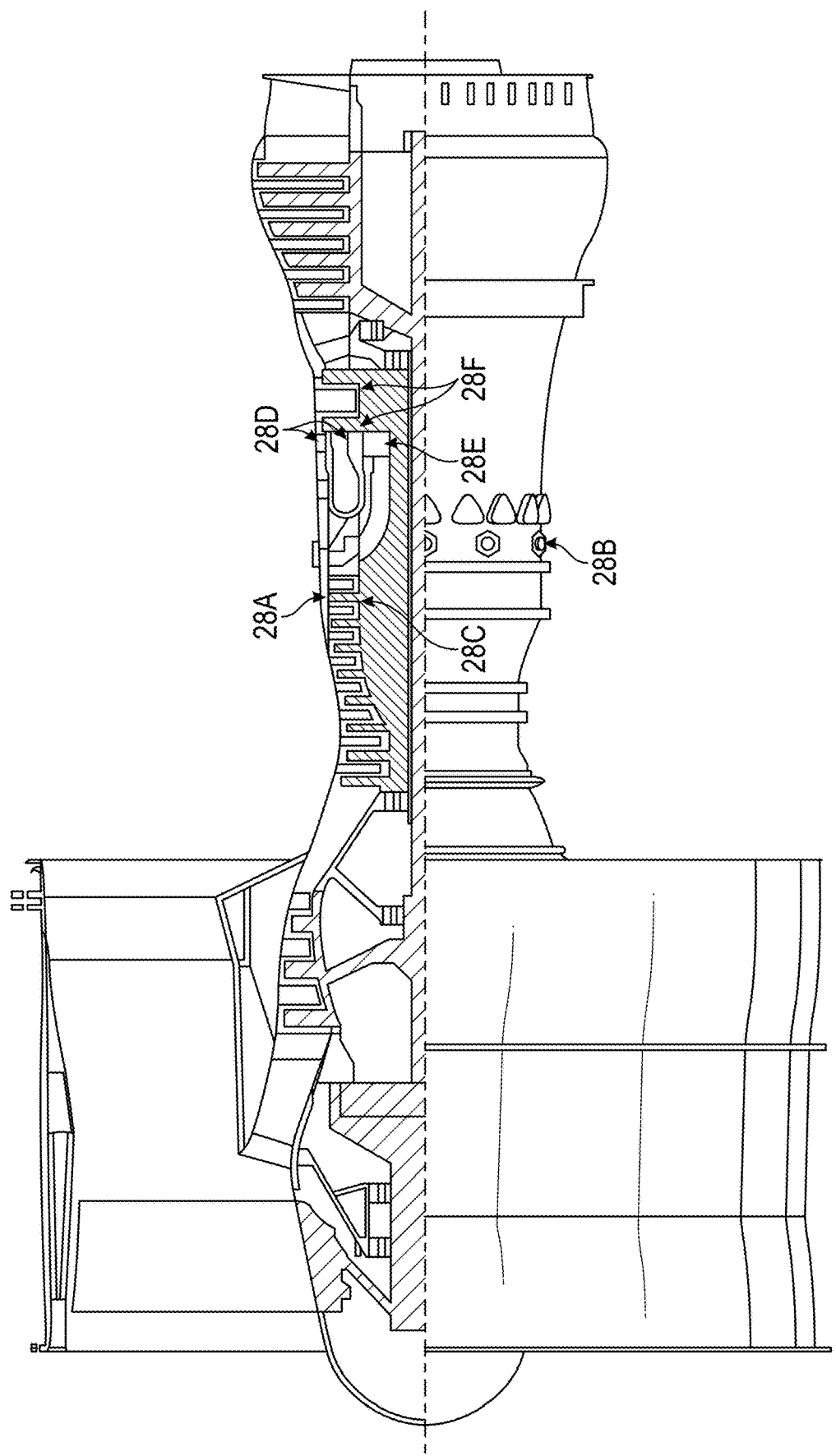
FIG. 3 is a partial schematic illustration of a gas turbine in accordance with an embodiment of the disclosure.

Referring now to FIG. 3, various non-limiting locations of the particle collection device or apparatus or aero lens device 28 are illustrated as 28A, 28B, 28C, 28D, 28E and 28F. Location 28A may be referred to as the turbine cooling air pipe compressor off take while location 28B may be referred to as the turbine cooling air pipe turbine inlet (2nd vane). Location 28C may be referred to as the compressor bleeds and location 28D may be referred to as the 1st vane meters (inside diameter (ID) and outside diameter (OD)). Location 28E may be referred to as the disk hub meters and location 28F may be referred to as the blade air supply chimneys.

In FIG. 3, the illustrated locations typically already have orifices or openings that can be used as the first orifice or opening 34 and thus only a second plate or member 38 with a second orifice or opening 40 and a collection chamber 42 is required to be located in the engine 10. Of course, other locations not illustrated in FIG. 3 may be utilized for particle collection device or apparatus or aero lens device 28 for example, the device may be may be placed in the engine secondary flow system for the sole purpose of dirt purge.

Figure 4:
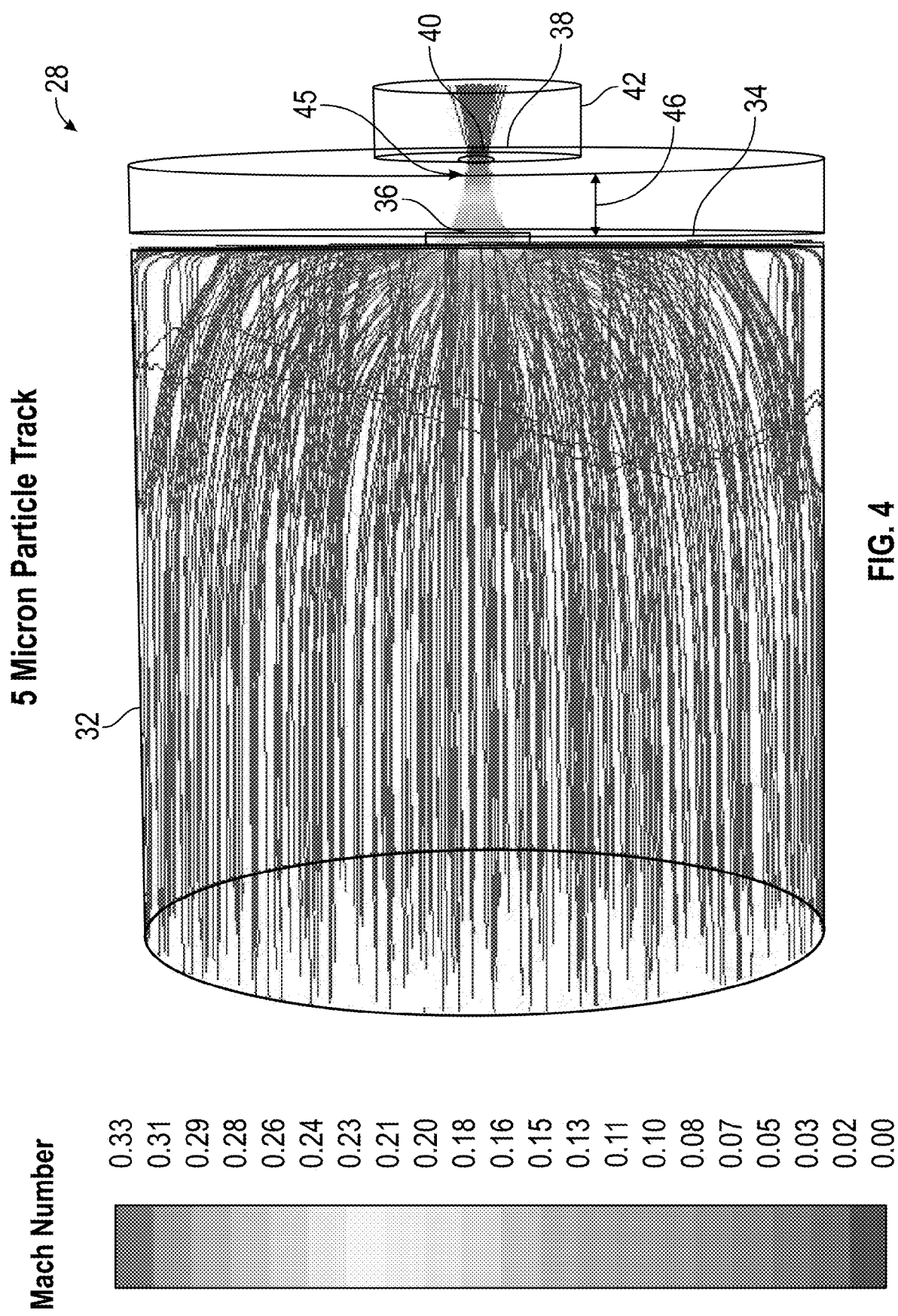
FIG. 4 is a graphical illustration of a 5 micron particle track into a particle collection device in accordance with an embodiment of the disclosure.
Figure 5:
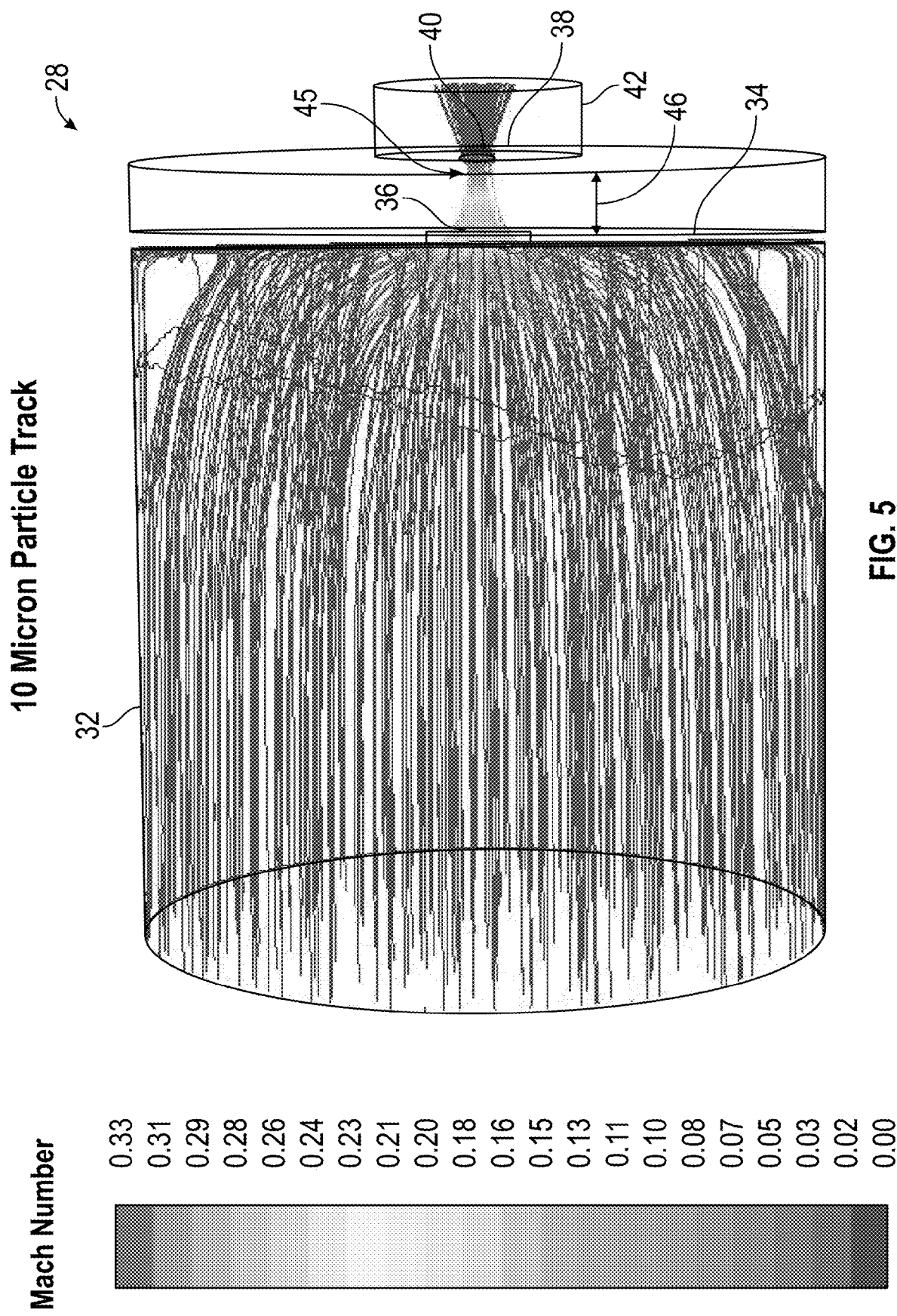
FIG. 5 is a graphical illustration of a 10 micron particle track into a particle collection device in accordance with an embodiment of the disclosure.
Figure 6:
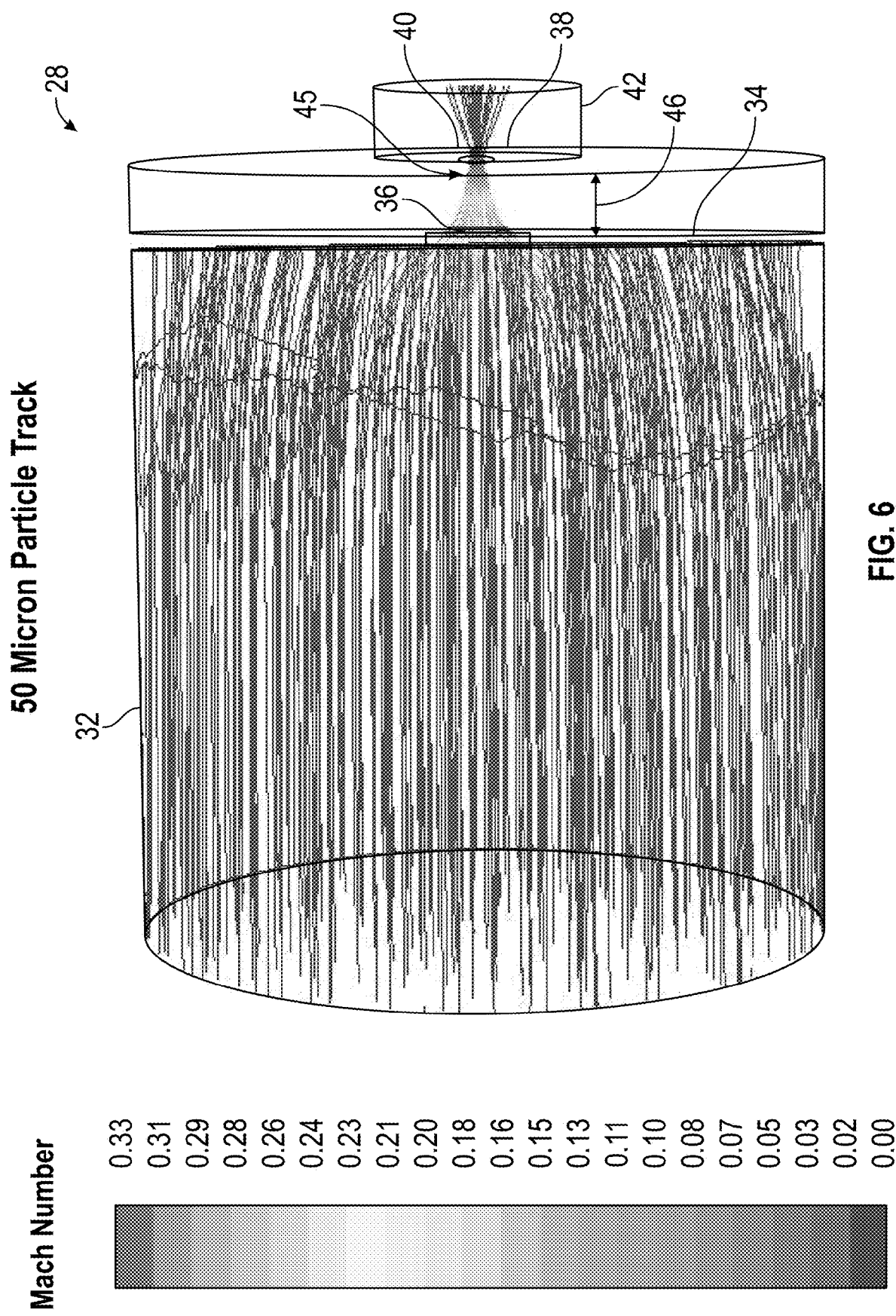
FIG. 6 is a graphical illustration of a 50 micron particle track into a particle collection device in accordance with an embodiment of the disclosure.
Figure 7:
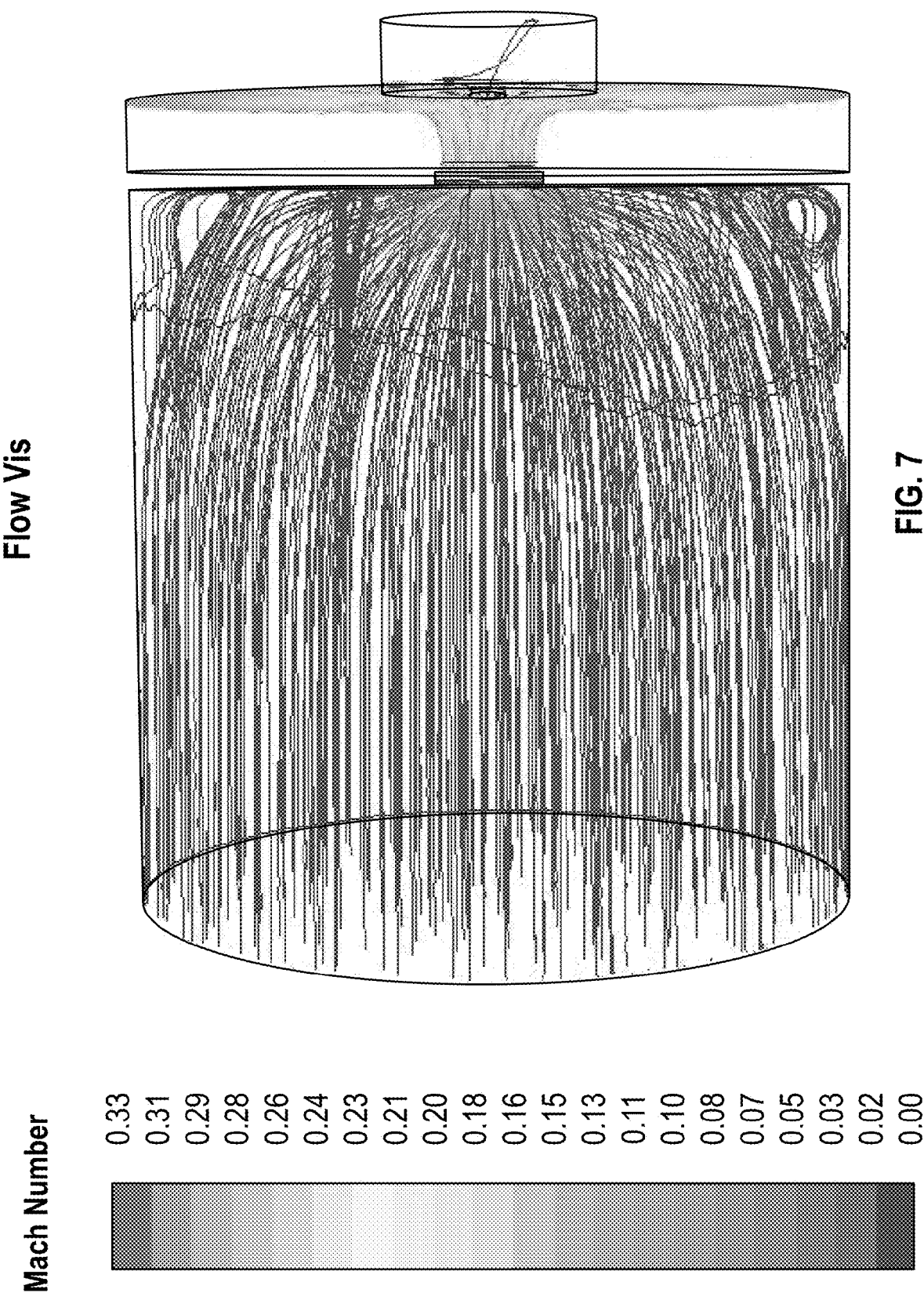
FIG. 7 is a graphical illustration of an air flow into a particle collection device in accordance with an embodiment of the disclosure.

In FIG. 4 a graphical illustration of a 5 micron particle track into the particle collection device or aero lens device 28 in accordance with an embodiment of the disclosure is illustrated. As can be seen particles are collected or focused into the collection chamber 42 the majority of the airflow may be in the directions of arrows 48. In FIG. 5 a graphical illustration of a 10 micron particle track into the particle collection device or aero lens device 28 is illustrated and FIG. 6 is a graphical illustration of a 50 micron particle track into the particle collection device or aero lens device 28 is illustrated.

In accordance with various embodiments of the disclosure, air travelling in the engine first goes through a first orifice and particles are collected into a dead or almost dead chamber by using an aerodynamic lensing effect. Aerodynamic lensing concentrates particles that are low in concentration to allow for easier detection. As the particles approach the first orifice they are drawn in and follow their momentum forming a focal point a length of which is determined by particle size and as the air turns to go around the dead or almost dead chamber the particles are forced to follow their own trajectory into a collection zone of second orifice that is fluidly coupled to a collection chamber.

Accordingly and in one embodiment of the disclosure, the amount of particles that reach the cooling air of the high pressure turbine (HPT) and low pressure turbine (LPT) may be limited or reduced. By removing or reducing the amount of particles that get into the cooling air this may increase the operational life of the HPT or LPT as particles entering the cooling air of the HPT and LPT can decrease the operational life by either coating the internals of the HPT and LPT and thus increasing external Temperatures or plugging holes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A cooling system for components of a gas turbine engine, the cooling system comprising:
    a particulate collection device, the particulate collection device including:
    a first member of the cooling system, the first member having a first orifice located therein, the first orifice being fluidly coupled to the cooling system of the gas turbine engine;
    an inlet for directing air towards the first member; and
    a second member having a second orifice located therein, the second orifice being aligned with the first orifice, wherein the second member and the second orifice are spaced from the first member and the first orifice by a first distance, the first distance and a size of the first orifice and a size of the second orifice concentrate particles of a particular size into the second orifice via aerodynamic lensing, wherein the size of the second orifice is smaller than the size of the first orifice;
    a collection chamber coupled to the second member such that the second orifice is fluidly coupled to the collection chamber; and
    wherein the cooling system is located within the gas turbine engine and cools components of the gas turbine engine proximate to a combustor of the gas turbine engine.

2. The particle collection device of claim 1, wherein the particle collecting device captures particles having a dimension of less than 50 microns in the collection chamber.

3. The particle collection device of claim 1, wherein the particle collecting device captures particles having a dimension of less than 10 microns in the collection chamber.

4. The particle collection device of claim 1, wherein the particle collecting device captures particles having a dimension of less than 5 microns in the collection chamber.

5. The particle collection device of claim 1, wherein the first distance is in the range of 0.0625 to 0.50 inches.

6. The particle collection device of claim 1, wherein a diameter of the first orifice is in the range of 0.0625 to 0.50 inches and a diameter of the second orifice is smaller than the first orifice.

7. The particle collection device as in claim 1, wherein the collection chamber is removably secured to the second orifice.

8. A gas turbine engine, comprising:
    a combustor;
    a cooling system for blades or vanes of the gas turbine engine, the blades and vanes being proximate to the combustor;
    a particulate collection device, the particulate collection device including:
    a first member of the cooling system, the first member having a first orifice located therein, the first orifice being fluidly coupled to the cooling system of the gas turbine engine;
    an inlet for directing air towards the first member; and
    a second member having a second orifice located therein, the second orifice being aligned with the first orifice, wherein the second member and the second orifice are spaced from the first member and the first orifice by a first distance, the first distance and a size of the first orifice and a size of the second orifice concentrate particles of a particular size into the second orifice via aerodynamic lensing, wherein the size of the second orifice is smaller than the size of the first orifice;
    a collection chamber coupled to the second member such that the second orifice is fluidly coupled to the collection chamber; and
    wherein the cooling system is located within the gas turbine engine and cools the blades and the vanes.

9. The gas turbine engine of claim 7, wherein the gas turbine engine further comprises a fan for directing the air into the engine.

10. The gas turbine engine of claim 7, wherein the second orifice is fluidly coupled to a collection chamber and wherein the first orifice is fluidly coupled to the cooling system of the gas turbine engine.

11. The gas turbine engine of claim 7, wherein the particle collecting device concentrates particles having a dimension of less than 5 microns in the collection chamber.

12. The gas turbine engine of claim 7, wherein the particle collecting device concentrates particles having a dimension of less than 10 microns in the collection chamber.

13. The gas turbine engine of claim 7, wherein the particle collecting device concentrates particles having a dimension of less than 50 microns in the collection chamber.

14. The gas turbine engine of claim 7, wherein the particle collection device is one of a plurality of a particle collection devices of the cooling system of the gas turbine engine.

* * * * *